United States Patent [19]

Masuda et al.

[11] 3,764,818

[45] Oct. 9, 1973

[54] SWITCHING CIRCUIT

[75] Inventors: Noboru Masuda, Saitama; Masasi Kuroyanagi, Tokyo, both of Japan

[73] Assignee: Denki Onkyo Co., Ltd., Tokyo, Japan

[22] Filed: Nov. 9, 1971

[21] Appl. No.: 196,923

[30] Foreign Application Priority Data

Nov. 9, 1970 Japan .............................. 45/98525

[52] U.S. Cl. .................. 307/296, 307/254, 307/241

[51] Int. Cl. .......................................... H03k 1/00

[58] Field of Search .................. 307/310, 296, 397, 307/242, 241, 254; 332/7, 9

[56] References Cited

UNITED STATES PATENTS 3,329,869 7/1967 Obenhaus .................... 307/242 UX

*Primary Examiner*—John W. Huckert
*Assistant Examiner*—B. P. Davis
*Attorney*—James E. Armstrong et al.

[57] ABSTRACT

A switching circuit compensating the bias potential of a switching element by automatically varying the value of the current supplied by a current control means to a matrix, comprising a bias resistor circuit formed by series connecting a semiconductor device having a resistance effect and a fixed resistor, a impedance matrix formed by connecting in parallel said bias resistor circuit to a power supply, a control means interpositioned between the impedance matrix and the power supply, and a switching element provided in each bias resistor circuit of said impedance matrix wherein a control electrode is connected between said semiconductor device and fixed resistor.

9 Claims, 10 Drawing Figures

SWITCHING CIRCUIT

BACKGROUND OF THE INVENTION

The present invention relates to an electrical non-contact switching circuit employing a resistance effect device as a bias resistor of the switching element.

The resistance effect device to be employed in this type of switching circuit includes a magneto-sensing device such as a magneto-resistance effect device, a pressure sensing device in which internal resistance varies with the magnitude of the pressure applied to the device, or a photo-electric conversion device in which the resistance value varies in accordance with the variation in the quantity of radiated light. These devices require a temperature compensating circuit since any one of the devices alone does not provide very excellent temperature characteristics.

The present invention provides a switching circuit which may be economically and easily formed and which is capable of compesating temperatures.

SUMMARY

This switching circuit comprises (a) a current control means such as, for example, a fixed resistor and transistor which are connected to an AC or DC power supply and (b) an impedance matrix which is connected to said current control means wherein, said impedance matrix is formed by a parallel combination of a plural number of bias resistor circuits comprising the resistance effect devices (such as, a magneto-resistance effect device in which the resistance value varies with a variation in magnetic flux density to which the device is exposed, a pressure sensing device in which the resistance value varies with the magnitude of the pressure applied thereto, or a photo-electric conversion device in which the resistance value varies in accordance with the quantity of light radiated, etc.) and fixed resistors; the resistance effect devices of each resistance circuit being arranged so that they are positioned on the same pole side of the power supply and are provided with an actuating means such as, for example, a adjustable magnet, pressing mechanism and light source to vary internal resistance when desired; the control electrode of the switching element of, for example, the transistor, integrated circuit, etc., that is, the base electrode of the transistor, being respectively connected to an intermediate position between the device and fixed resistor of each bias resistance circuit; thus the present invention provides the switching circuit which controls the current value so that said current control means compensates the potential of the controlled electrode of said switching element in response to variations in the resistance of the impedance matrix which is caused by the resistance of said resistance effect device varying with the temperature.

BRIEF DESCRIPTION OF THE DRAWINGS

The present invention is illustrated in detail on the accompanying drawings whereon.

DETAILED DESCRIPTION OF THE INVENTION

Figure 1:
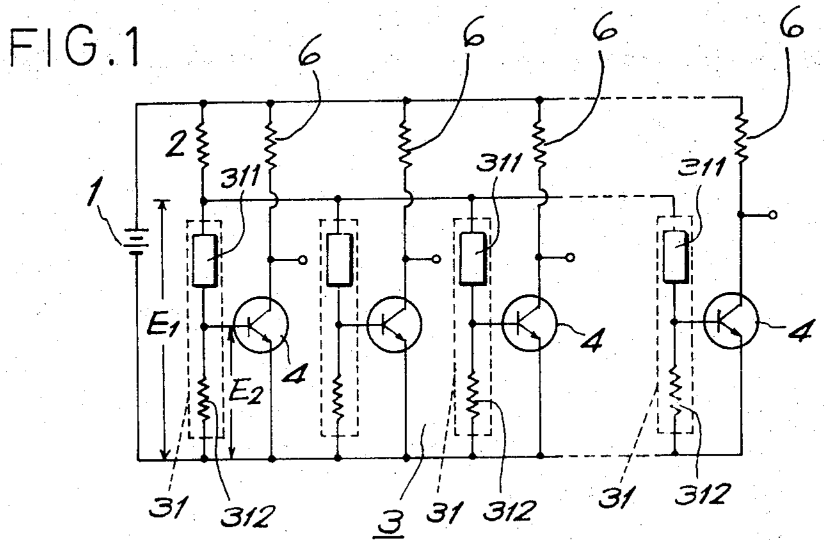
FIGS. 1 and 2 are the circuit diagrams illustrating the circuits according to the present invention.

Referring to FIG. 1, the switching circuit is comprised of fixed voltage power supply 1, fixed resistor 2 as the current control means connected to the positive electrode of the power supply and impedance matrix circuit 3 connected to said fixed resistor 2.

The impedance matrix circuit is formed by parallel connecting a plural number of bias resistance circuits 31 to control resistor 2 and is set so that the impedance of the matrix circuit becomes considerably lower than that of control resistor 2.

Bias resistance circuits 31 are formed with the resistance effect devices, for example, magneto-resistance effect device 311 which is connected to control resistor 2 and fixed resistor 312 which is series-connected to the resistance effect device and has a resistance that is nearly constant with changes in the temperature. The switching element such as, for example, the base of the NPN transistor 4 is connected between device 311 and fixed resistor 312. The voltage across both ends of said bias resistance circuit is applied to said transistor 4 as the bias voltage after having been divided by magneto-resistance effect device 311 and fixed resistor 312.

A magnetic field is constantly applied to said device 311 to reduce the potential at the base of transistor 4. Accordingly, transistor 4 can be forced to accept the current by stopping application of the magnetic field when desired to raise the base potential of transisotor 4.

Figure 3:
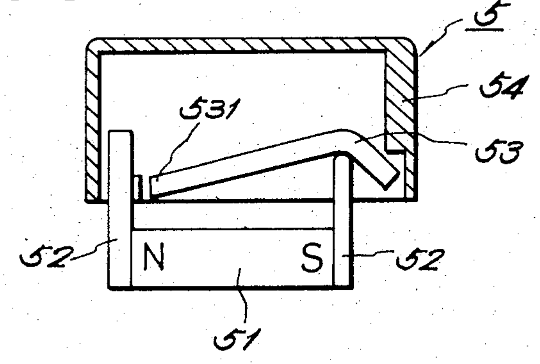
FIG. 3 is a side view illustrating an example of the actuating means employed in the circuit according to the invention.

Thus, mechanism 5 as shown in FIG. 3 is employed as a means to vary the magnetic field.

This device comprises fixed magnetic yokes 52 being opposed at both magnetic poles of magnet 51, magneto-resistance effect device 311 being mounted on one of the fixed yokes and moving magnetic yoke 53 mounted on the other yoke, whereby free end 531 of moving yoke 53 is attracted to or repelled from the magneto-resistance effect device. Accordingly, the push-button switch mechanism may be formed by capping the moving yoke with push-button cap 54.

In the embodiment shown in FIG. 1, it is contemplated that, when the magnetic field applied to device 311 is removed, the current flows in load resistor 6 connected to the collector of transistor 4. The relationship between the magnetic field and the current flowing in the load resistor can be the reverse of the embodiment; for example, the PNP transistor can be employed as the switching element or the position of device 311 can be interchanged with that of fixed resistor 312.

As described above, with respect to the switching circuit, ratio RB/RO of internal resistance RO of the device in the absence of a magnetic field and internal resistance RB of the device when a magnetic field is applied, that is, the resistance variation ratio deteriorates greatly when the temperature of the device becomes high since the temperature characteristic of this type of device is inferior in quality.

Figure 4:
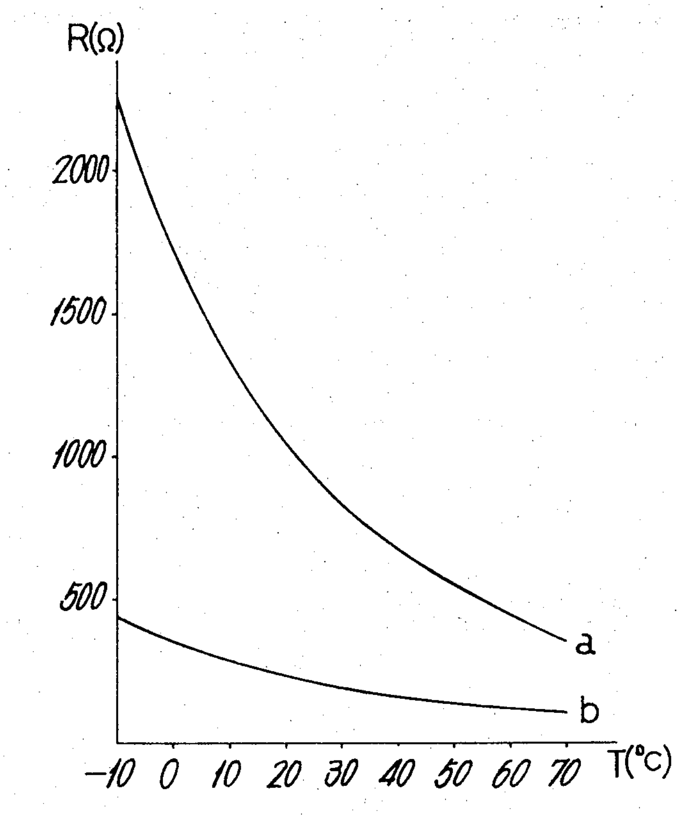
FIG. 4 is a graph indicating the temperature characteristic of the magneto-resistance effect device employed in said circuit.

For example, the resistance variation characteristic of the magneto-resistance effect device abruptly decreases in accordance with a rise in the temperature as indicated by line *a* in FIG. 4 when the magnetic field of 4.5K gauss is applied to the device; however, when a magnetic field is not applied to the device, the resistance variation characteristic does not show any great change as indicated by line *b* in FIG. 4. Accordingly, if the device is employed individually as the bias resistor of a transistor, the base potential of the transistor rises due to the decrease in internal resistance of the device and the transistor inevitably permits the current to flow even though the magnetic field is applied to the device when the temperature of the device rises.

According to the switching circuit of the present invention, erroneous operation of the switching element due to the resistance variation characteristic of the device is compensated, for the following reason.

To simplify the description, the current to be supplied to impedance matrix circuit 3 is maintained at a fixed level through current control resistor 2 and the magnetic field is constantly applied to device 311. It is assumed, under this condition, that current does not flow in the base of transistor 4. Under this circuit condition, voltage $E_1$ across both ends of bias resistance circuit 31 or across both ends of matrix 3 is maintained at a constant level but decreases if the temperature rises since device 311 possesses the temperature characteristic previously described.

Figure 5:
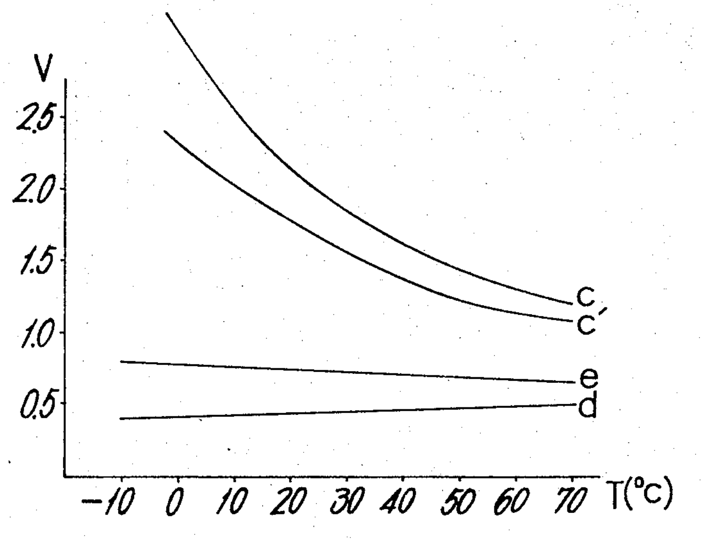
FIG. 5 is a graph indicating the voltage characteristic of said circuit.

The variation characteristic of voltage $E_1$ with respect to the temperature is as shown by line *c* in FIG. 5 under the conditions of a power supply voltage of 24V, current control resistor of 750Ω, load resistor of 5.6kΩ, fixed resistor of the bias resistance circuit of 150Ω, magneto-resistance effect device of 150Ω or less when a magnetic field is not applied and 460Ω or over when magnetic field is applied, and the number of bias resistance circuits being four to 15.

Deterioration of the characteristic of voltage $E_1$ varies with the number of bias resistance circuits. The more the number of bias resistance circuits, the duller the deterioration characteristic of the voltage becomes. If the number of bias resistance circuits becomes large, line *c* in FIG. 5 then approximates line *c'*. In any case, the deterioration characteristic shows the same tendency as the resistance variation of device 311 with respect to the temperature. Furthermore, the deterioration characteristic of voltage $E_1$ is determined by the relationship between impedance R*n* of fixed resistor 312 forming the bias resistance circuit and impedance R*n'* of resistance effect device 311.

When voltage $E_1$ across both ends of bias resistance circuit 3 decreases, voltage $E_2$ across both ends of fixed resistor 312 tends to increase and, when voltage $E_1$ rises, voltage $E_2$ tends to decrease.

Therefore, the fluctuation of voltage $E_2$ across both ends of fixed resistor 312 shows an opposite tendency to the fluctuation of voltage $E_1$ across both ends of bias resistance circuit 31.

Voltage $E_2$ appears as line *d* in FIG. 5 when a magnetic field is applied and as line *e* in FIG. 5 when a magnetic field is not applied.

Voltage $E_2$ when a magnetic field is not applied, tends to decrease in accordance with a rise in the temperature. When the temperature rises, the threshold voltage decreases due to the temperature characteristic of transistor 4. The slight decrease of voltage $E_2$ is not a problem.

The embodiment shown in FIG. 1 is as described above and the switching circuit of this embodiment is advantageous as follows:

The operation of switching element 4 is ensured since the impedance of the matrix circuit does not vary even though one of the number of bias resistance circuits forming the impedance matrix is selected and the resistance of resistance effect device 311 is varied.

In the embodiment above, since the current abruptly flows in the transistor of the resistance circuit if the resistance of a specific bias resistance circuit is varied, the current flowing in other bias resistance circuits decreases temporarily and the base potential of the transistors of these resistance circuits is therefore further lowered. Consequently, the mutual unfavorable effect of the resistance circuits can be completely prevented and inactive status of the transistors which are not actuated can be properly maintained.

Figure 10:
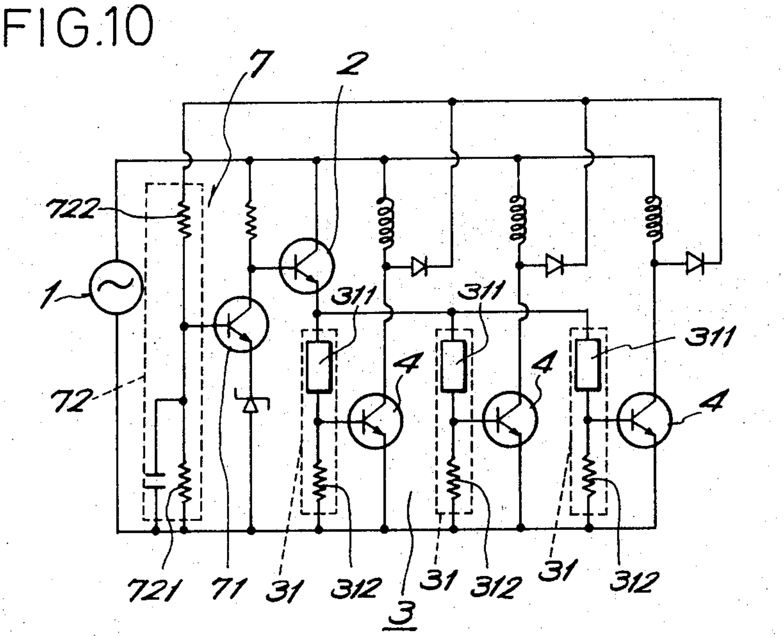

However, this effect can be obtained due to a number of bias resistance circuits and the resistance effect devices are alternatively actuated. On the contrary, if the impedance of the matrix circuit varies greatly as in the case of only a small number of bias resistance circuits, for example, three bias resistance circuits as shown in FIG. 10, or when more than two resistance effect devices operate simultaneously, the voltage at current control resistor 2 lowers greatly and the base potential of switching element 4 varies. In this case, it is desirable to insert power supply circuit 7 which can respond to the resistance variation of matrix circuit 3 between power supply 1 and current control means 2 as shown in FIG. 2.

Figure 2:
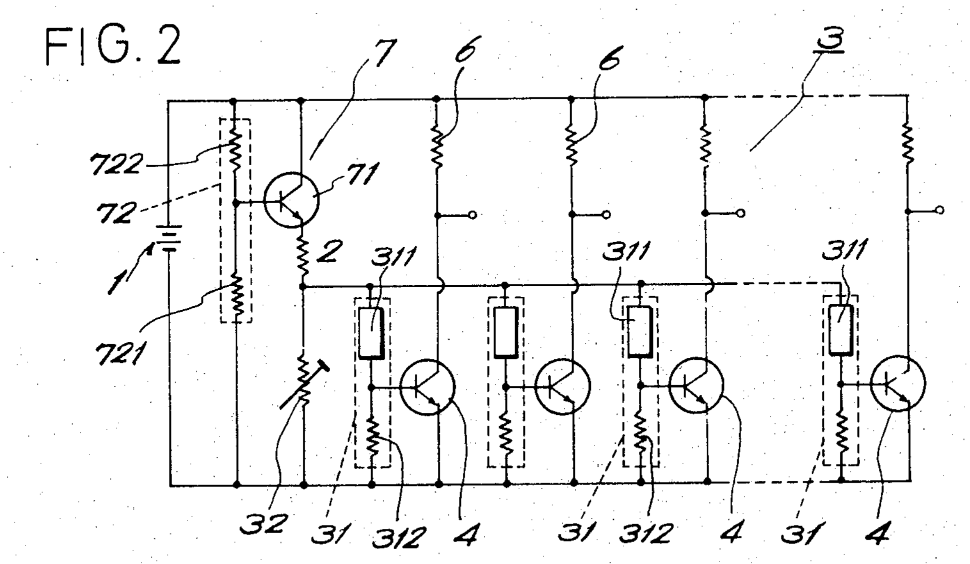

Power supply circuit 7 shown in FIG. 2 is such that transistor 71 is connected between current control resistor 2 and power supply 1, the emitter of the transistor is connected to resistor 2, and one end of bias resistor 72 of transistor 71 together with one end of bias resistance circuit 31 of matrix circuit 3 is connected to the power supply.

According to this embodiment, when the impedance of matrix circuit 3 decreases, the base potential of transistor 71 rises relatively and the current flowing in transistor 71 becomes larger. On the contrary, when the impedance of matrix circuit 3 rises, the base potential of transistor 71 becomes low, and the current flowing in transistor 71 becomes small, thus forming the so-called feedback loop. Accordingly, the base potential of transistor 4 can be compensated by adjusting the magnitude of the current to be supplied to the matrix circuit to a value in a reverse relation to increase or decrease of the impedance of the matrix circuit.

In the embodiment above, if fixed resistor 721 of resistors 721 and 722 which form bias resistor 72 is replaced with the regulated diode, the temperature compensation effect is improved and, if stabilized resistor 32 is connected to both ends of matrix circuit 3, the fluctuation of the voltage across both ends of the matrix circuit can be reduced.

According to this embodiment, more than two resistance effect devices 311 can be actuated simultaneously since the base potential of the transistor can be compensated even though the impedance of the matrix circuit varies greatly.

The conditions of the switching circuit according to the present invention can be set as follows:

1. It is desirable that the impedance of current control means 2 is equal to or larger than the impedance of matrix circuit 3 in the range of temperatures which requires compensation.

If the impedance of the matrix circuit decreases in accordance with the rise in temperature, the impedance of current control means 2 should be determined with reference to the level to which the temperature rises and if the impedance of the matrix circuit increases in accordance with the rise in temperature, it should be determined with reference to the level to which the temperature lowers.

2. Resistance effect device 311 may have either a positive temperature characteristic or negative temperature characteristic.

3. The bias resistance circuit on resistance effect device 311 side can be connected to the current control means or at fixed resistor 312 side, to the current control means.

4. A semiconductor device such as a transistor, etc. can be employed as the current control means. It is desirable to select a semiconductor which has the same temperature characteristic as that of the resistance effect device of the bias resistance circuit.

Figure 6:
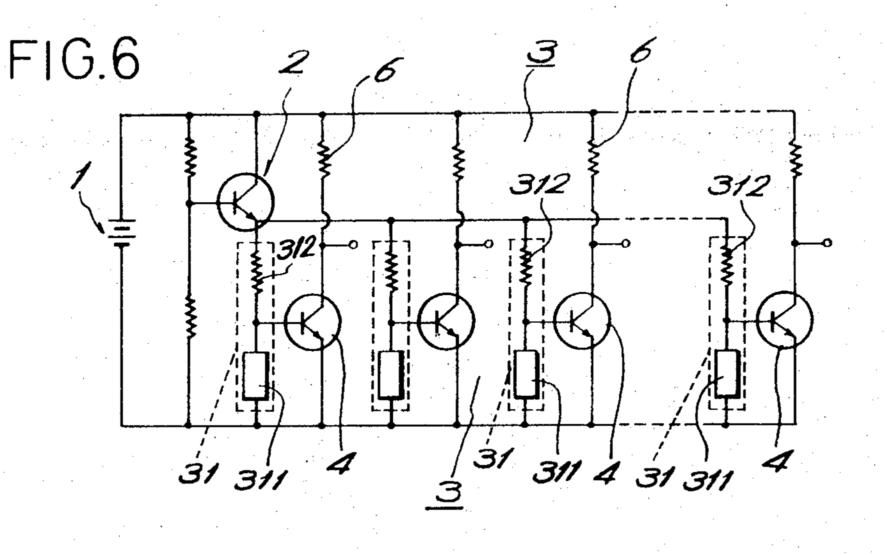
FIGS. 6 to 10 are circuit diagrams indicating the other embodiments of the circuit.

If a NPN transistor is employed in power supply circuit 7 as shown in FIG. 2 or is employed as current control means 2 as shown in FIG. 6 in the event the magnetro-resistance effect device is employed as resistance effect device 311, the threshold voltage (actuating point) of power supply circuit 7 or the transistor of the control means decreases. Thus, the bias potential of switching element 4 can be compensated by increasing the current supplied to the matrix circuit.

5. Table 1 shown below indicates the relationship between the temperature characteristic of the resistance effect device and circuit configuration.

TABLE 1

| Type | Temp. factor of device | Current control means | Position of resistance effect device | Operation | Voltage |
|---|---|---|---|---|---|
| A | + | Fixed resistor | Lower | ON | large |
| | | | | OFF | small |
| B | + | Transistor | Upper | ON | small |
| | | | | OFF | large |
| C | – | Fixed resistor | Upper | ON | small |
| | | | | OFF | large |
| D | – | Transistor | Lower | ON | large |
| | | | | OFF | small |

The upper position is a position between current control means 2 and fixed resistor 312, and the lower position means that fixed resistor 312 and device 311 are interchanged in FIG. 1. ON in the Operation column of the above Table means that the magnetic field is applied to the device and OFF, that the magnetic field is not applied to the device. The voltage referred to is the voltage applied to the base of the transistor.

The switching circuit according to the present invention is formed as shown in FIGS. 6 to 10.

The circuit shown in FIG. 6 corresponds to type D in Table 1. Accordingly to this switching circuit, when the internal resistance of resistance effect device 311 decreases due to a variation in the temperature, the transistor employed as current control means 2 has deep continuity to increase the current supplied to the matrix circuit.

Figure 7:
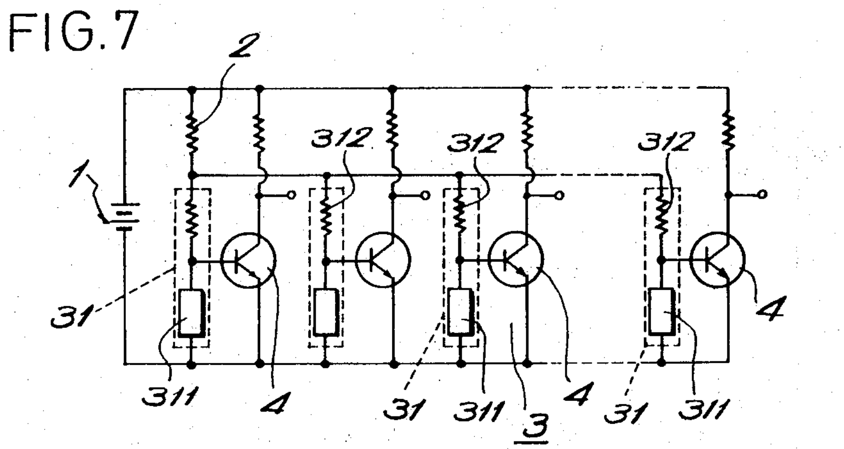

The switching circuit shown in FIG. 7 corresponds to type A in Table 1. According to this circuit, when the internal resistance of resistance effect device 311 increases due to a variation in the temperature, the impedance of the matrix circuit increases and the base potential of switching element 4 tends to increase. On the other hand, the current flowing in the matrix circuit decreases and the base potential tends to decrease thereby consequently compensating the base potential.

Figure 8:
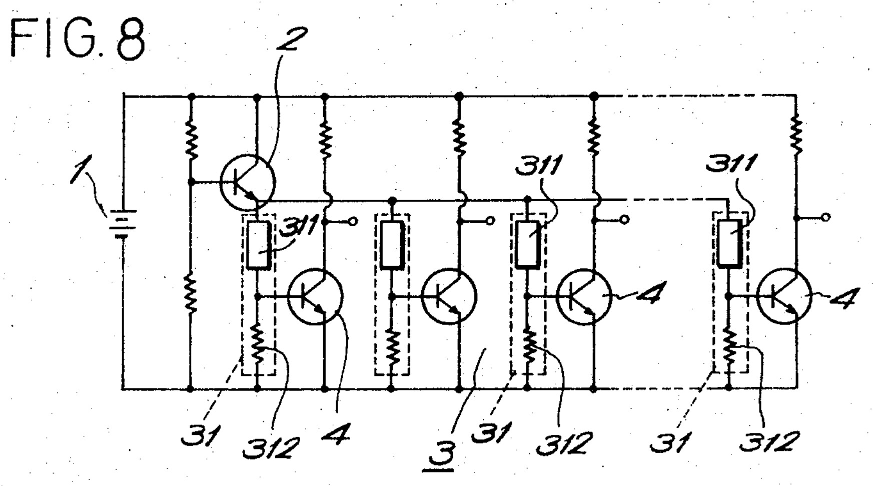

The switching circuit shown in FIG. 8 corresponds to type B in Table 1. When the internal resistance of resistance effect device 311 increases due to a variation in the temperature, the impedance of the matrix circuit increases and the base potential of switching element 4 tends to increase. In this case, the current flowing in bias resistance circuit 31 decreases and the base potential of the transistor 2 employed as the current control means therefore decreases to reduce the current supplied to the matrix circuit, thus limiting the base potential of switching element 4 which tends to increase.

Figure 9:
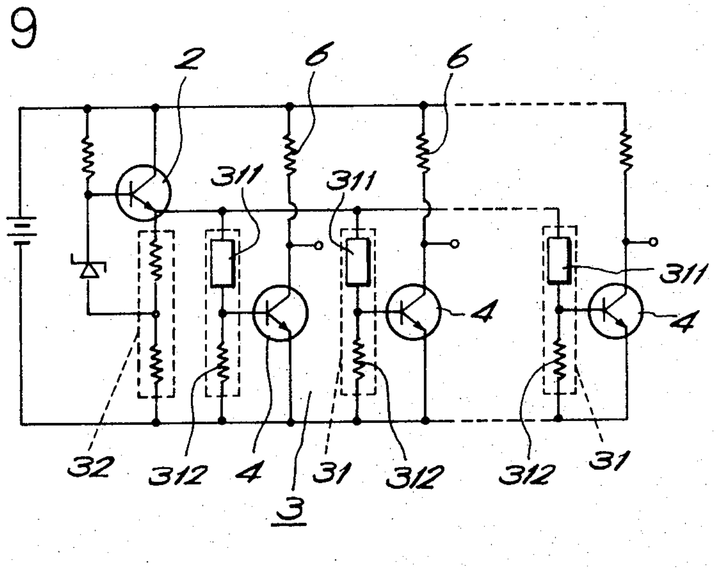

In the switching circuit shown in FIG. 9, the transistor is employed as current control means 2 and the bias potential of the transistor is controlled by stabilized resistor 32 of matrix circuit 3. According to this circuit, the base potential of transistor 2 can be directly controlled by varying the impedance of the matrix circuit.

The switching circuit shown in FIG. 10 includes power supply circuit 7 in addition to transistor 2 employed as the current control means. This circuit is employed to select and actuate more than two switching elements as in the case of the motor, etc. at the same time.

What we claim is:

1. A temperature compensated switching circuit comprising, a. an impedance matrix circuit including a plural number of bias resistance circuits, each containing series-connected semiconductor devices having a resistive effect and a fixed resistor wherein said bais resistance circuits are parallel-connected;

b. current control means connected between a power supply and said impedance matrix circuit, wherein said current control means controls the current through said impedance matrix circuit;

c. switching means having a control electrode connected to each bias resistance circuit such that the voltage across both ends of the matrix circuit is divided by semiconductor devices and fixed resistors, and applied to said control electrode, and d. at least one actuating means, which selects at least one semiconductor device of said matrix circuit when actuated, for varying the resistance value of the selected semiconductor device, wherein the switching circuit is related to the matrix circuit so that said current control means decreases the current flowing therein when the impedance of said matrix circuit increases and increases the current flowing therein when the impedance of the matrix circuit decreases.

2. A switching circuit according to claim 1, wherein a fixed resistor is included as the current control means and wherein said matrix circuit includes semiconductor devices having negative temperature characteristics, connected such that the semiconductor devices are positioned on the same side as the current control means.

3. A switching circuit according to claim 1, wherein a fixed resistor is employed as the current control means and wherein said matrix circuit includes semiconductor devices having positive temperature characteristics connected such that the fixed resistors are positioned on the same side as the current control means.

4. A switching circuit according to claim 1, wherein transistors are includes as the current control means and the output terminal of said transistor is connected to said matrix circuit with the base of the transistor connected to a bias resistor so that it may be impedance controlled by the matrix circuit.

5. A switching circuit according to claim 4, wherein the matrix circuit includes semiconductor devices having positive temperature characteristics, connected to the transistor included as the current control means such that the semiconductor devices are positioned on the output side of the current control transistor.

6. A switching circuit according to claim 4, wherein a matrix circuit including semiconductor devices having negative temperature characteristics is connected to the transistor included as the current control means such that the fixed resistors are positioned on the output side of the current control transistor.

7. A switching circuit according to claim 1, wherein a power supply circuit, which varies the current value to be supplied to the current control means to assist the control function of the means, is connected to said current control means and the power supply circuit includes the transistor which is actuated by the bias potential controlled in accordance with the variation in the impedance of the matrix circuit.

8. A switching circuit according to claim 7, wherein a regulated diode is employed for bias resistance of the transistor of the power supply circuit.

9. A switching circuit according to claim 1, wherein a stabilized resistor circuit is connected across both ends of the impedance matrix circuit so that the stabilized resistor circuit is parallel-connected to the bias resistance circuits.

* * * * *